United States Patent
Haas et al.

[11] 3,938,880
[45] Feb. 17, 1976

[54] SPHERULITIC LIQUID CRYSTALLINE TEXTURE

[75] Inventors: Werner E. L. Haas, Webster; James E. Adams, Bear Creek Harbor East, both of N.Y.

[73] Assignee: Xerox Corporation, Stamford, Conn.

[22] Filed: May 28, 1974

[21] Appl. No.: 473,598

[52] U.S. Cl. .................................. 350/160 LC
[51] Int. Cl.² .................................. G02F 1/13
[58] Field of Search .............. 252/299; 350/160 LC

[56] References Cited
UNITED STATES PATENTS

| | | | |
|---|---|---|---|
| 3,703,331 | 11/1972 | Goldmacher et al. | 350/160 LC |
| 3,803,050 | 4/1974 | Haas et al. | 350/160 LC X |
| 3,806,230 | 4/1974 | Haas | 350/160 LC |

OTHER PUBLICATIONS
Hezlmeier et al. "A New Electric-Field-Controlled..." APL Vol. 13, No. 4 pp. 132–3, 15 Aug. 1968.

*Primary Examiner*—Alfred E. Smith
*Assistant Examiner*—Matthew W. Koren
*Attorney, Agent, or Firm*—George J. Cannon

[57] ABSTRACT

Liquid crystalline compositions comprising dielectrically negative nematic liquid crystalline materials from about 0.4 percent by weight to about 3 percent by weight optically active materials, in contact with an aligning agent, and characterized by a helical pitch to layer thickness ratio of from about 1 to about 10 are transformed from an initially homeotropic or homogeneous texture into a novel stable spherulitic texture upon removal of an applied D.C. or low frequency A.C. electrical field. Erasure and imaging of the novel spherulitic texture are disclosed.

56 Claims, 9 Drawing Figures

SPHERULITIC LIQUID CRYSTALLINE TEXTURE

BACKGROUND OF THE INVENTION

This invention relates to liquid crystalline materials having optical storage capability and more particularly relates to a novel, stable liquid crystalline spherulitic texture, a process for the preparation thereof, the erasure thereof and the use thereof in liquid crystalline displays.

Liquid crystalline materials having optical storage capability are disclosed in U.S. Pat. Nos. 3,642,348; 3,680,950; 3,704,056. These liquid crystalline systems are transformed from a cholesteric liquid crystalline material from one of its Grandjean and focal-conic texture states to the other of its texture states. That is, the transformation from Grandjean to focal-conic or from focal-conic to Grandjean.

Cholesteric liquid crystalline materials are known to exhibit various observable textures. For example, cholesteric liquid crystals may adopt a focal-conic, or a Grandjean plane texture as modifications of the cholesteric mesophase itself, as described in Gray, G. W., MOLECULAR STRUCTURE AND THE PROPERTIES OF LIQUID CRYSTALS, Academic Press, London, 1962, pp. 39–54.

Generally speaking, liquid crystalline substances exhibit physical characteristics which include characteristics typically associated with liquids and characteristics which are typically associated with solid crystals. The name "liquid crystals" has become generic to substances exhibiting these dual properties. In addition to the cholesteric mesophase, liquid crystals are known to exist in the smectic and nematic mesophases. The three mesophase forms of liquid crystalline materials mentioned above are characterized by different structures wherein the molecules of the compound are arranged in a molecular structure which is unique to each of the three mesomorphic structures.

Each of these structures is well known in the liquid crystal art. For example, the smectic mesophase is typically structurally described as having its molecules arranged in layers with the major axes of the molecules approximately parallel to each other and approximately normal to the planes of the layers. Within a given layer, the molecules in the smectic mesophase may be organized in uniform rows or randomly distributed throughout the layer. The layers of the smectic mesophase are free to move in relation to each other because the attractive forces between the layers are relatively weak, thereby providing the smectic liquid crystalline substances with the mechanical properties of a planar or two-dimensional, soap-like fluid.

The nematic mesophase, on the other hand, is typically described in the literature as having molecules which are not organized into definite layers as in the smectic structure but which molecules have their major axes lying approximately parallel to one another locally.

The cholesteric mesophase is typically described in the literature as having molecules believed to be arranged in definite layers as in the smectic mesophase; however, within a given layer, molecules are believed to be arranged with their major axes approximately parallel in a fashion resembling the structure of nematic liquid crystals. The cholesteric structure derives its name from the fact that materials exhibiting the cholesteric liquid crystalline structure typically have molecules which are derivatives of cholesterol and which are shaped very similarly to molecules of cholesterol. Because of the shape of the cholesteric molecule, in the cholesteric structure the direction of the major axes of the molecules in each of the aforementioned thin layers is displaced slightly from the direction of the major molecular axes in the adjacent molecular layers. When compared to a hypothetical straight line axis passing through a cholesteric liquid crystalline substance and perpendicular to the molecular planes within said substance, the angular displacement of the direction of the molecular axes within each adjacent layer traces out a helical path around the hypothetical straight line axis.

More particularly, with respect to the cholesteric mesophase, the two predominately studied textures are typically described in the literature as follows. The focal-conic and Grandjean textures are similar to each other in that they both have the same local symmetry, namely, helical; but the orientation of the helical regions vary greatly. The Grandjean texture consists of regions of helical order the axes of which are all approximately parallel to each other and normal to the substrate, whereas the focal-conic texture consists of similar regions the axes of which are all approximately parallel to the substrate and oriented randomly in that plane. The Grandjean texture of the cholesteric mesophase is typically characterized by selective dispersion of incident light around a wavelength $\lambda_o$ (where $\lambda_o = 2np$, where n equals the index of refraction of the liquid crystalline film and $p$ equals the pitch of the liquid crystalline film) and optical activity for wavelengths of incident light away from $\lambda_o$. If $\lambda_o$ is in the visible spectrum, the liquid crystalline film appears to have the color corresponding to $\lambda_o$ for normal incidence and normal observation, and if $\lambda_o$ is outside the visible spectrum the film appears colorless and non-scattering. The Grandjean texture of cholesteric liquid crystals is sometimes referred to as the "disturbed" texture. The focal-conic texture is also typically characterized by selective dispersion but in addition this texture also exhibits diffuse scattering in the visible spectrum, whether $\lambda_o$ is in the visible spectrum or not. The appearance of the focal-conic texture state is typically milky white. The focal-conic texture of cholesteric liquid crystals is sometimes referred to as the "undisturbed" texture.

With regard to mixtures of nematics and optically active materials, it has been reported by A. D. Buckingham et al, *Chem. Phys. Letters*, 3, 7, 540 (1969) that the addition of small amounts, for example, about 10 percent by weight or less, of optically active, non-mesomorphic materials such as *l*-menthol and tartaric acid to nematic liquid crystalline materials will provide compositions having the optical properties of the cholesteric liquid crystalline mesophase. Also, U.S. Pat. No. 3,806,230 to Werner E. L. Haas, and assigned to a common assignee, discloses that liquid crystalline compositions possessing the optical properties of the cholesteric liquid crystalline mesophase and comprising a nematic liquid crystalline material and at least one optically active, non-mesomorphic material have optical storage capabilities upon removal of an applied electric field or current. An image formed according to the disclosure of said application is typically scattering and contrasts with the clear unaffected region not subjected to the electrical field. The application discloses that the image can be erased with a high frequency A.C. field.

In new and growing areas of technology such as liquid crystalline imaging systems, new methods, apparatus, compositions, and articles of manufacture are often discovered for the application of the new technology in a new mode. The present invention relates to a new and advantageous system for imaging liquid crystalline members.

SUMMARY OF THE INVENTION

It is, therefore, an object of this invention to provide a novel liquid crystalline composition exhibiting a novel, stable texture.

It is another object of this invention to provide a novel process for producing said texture.

It is yet a further object of this invention to provide a novel imaging system utilizing said texture.

It is still a further object of this invention to provide a novel imaging or display system having image memory or storage capability.

It is another object of this invention to provide an imaging system suitable for use in display devices which may be addressed by various means.

It is yet still a further object of this invention to transform a liquid crystalline composition having the optical characteristics of the homeotropic or homogeneous texture of the nematic mesophase into a stable, field-induced birefringent spherulitic texture.

Another object of this invention is to cause the stable, field-induced birefringent spherulitic texture to revert to its initial homeotropic or homogeneous texture state of the nematic mesophase.

The foregoing objects and others are accomplished in accordance with this invention by a system transforming layers of dielectrically negative nematics doped from about 0.4 percent by weight to about 3 percent by weight with optically active materials, having a helical pitch to layer thickness ratio of from about 1 to about 10 and having the optical properties of the homeotropic or homogeneous texture of the nematic mesophase, to a birefringent, slightly scattering spherulitic texture upon removal of an applied D.C. or low frequency A.C. voltage or potential; and an imaging system wherein the electrically induced transformation images a homeotropic or homogeneous nematic liquid crystalline member in a desired image configuration.

BRIEF DESCRIPTION OF THE DRAWINGS

For better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 1:
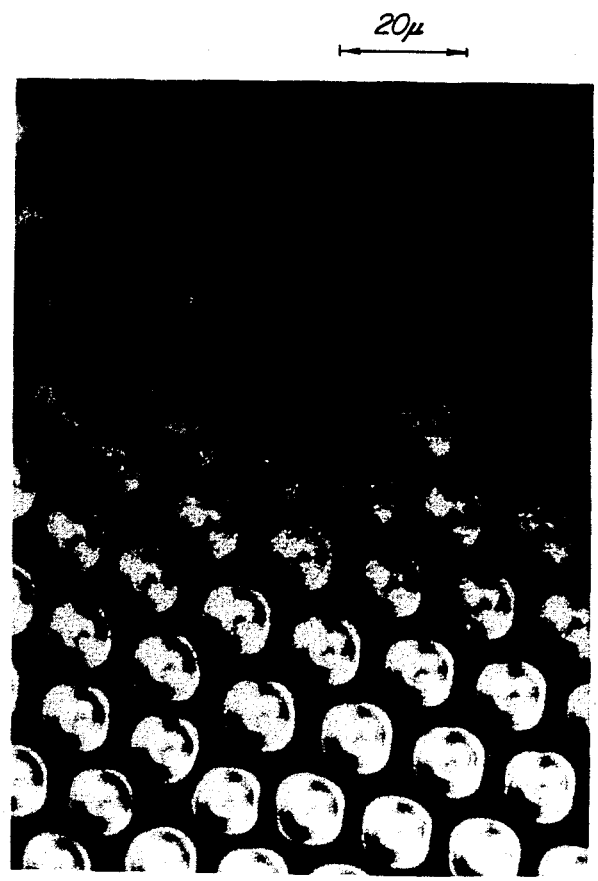
FIG. 1 is a photographic reproduction of a photograph taken through a microscope and is typically representative of the induced stable spherulitic texture produced in accordance with the invention.

In accordance with the process of the instant invention, liquid crystalline compositions of dielectrically negative nematic liquid crystalline materials and from about 0.4 percent by weight to about 3 percent by weight optically active materials are provided on a substrate in layer configuration and in either the homeotropic or homogeneous texture of the nematic mesophase. The layered compositions are characterized by a helical pitch to layer thickness ratio of from about 1 to about 10, and by either the homeotropic texture of the nematic mesophase (major axes of the molecules parallel to one another and perpendicular to the plane of the layer) or the homogeneous texture of the nematic mesophase (major axes of the molecules parallel to one another and parallel to the plane of the layer) in at least one region or portion of interest of the layer.

The homeotropic or homogeneous portion or region of interest of the layer is transformed from the homeotropic or homogeneous texture to a novel, stable spherulitic texture upon removal of an applied D.C. or low frequency A.C. voltage or potential.

The nematic liquid crystalline material can comprise any suitable dielectrically negative liquid crystalline nematic. These nematics align with the major axes of their molecules perpendicular to the electrical field created by a voltage applied across a layer of the nematic liquid crystalline material.

Typical suitable nematics are disclosed in Vol. 18, *Ann. Physique*, p. 273, G. Friedel (1922), hereby expressly incorporated by reference. Typical suitable dielectrically negative nematics include p-azoxyanisole, p-azoxyphenetole, p-ethoxybenzylidene-p'-n butylaniline, trans-4-butyl-α-chloro-4'-ethoxystilbene, trans-4-octyl-α-chloro-4'-ethoxystilbene, p-methoxybenzylidene-p'-n-butylaniline; mixtures of the above, and others.

Optically active material added to the dielectrically negative nematic to provide the liquid crystalline composition can comprise any suitable optically active materials, whether mesomorphic or non-mesomorphic. Mesomorphic optically active materials include, for example, optically negative liquid crystalline materials such as, for example, derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate; cholesteryl hexanoate; cholesteryl formate; cholesteryl docosonoate; cholesteryl propionate; cholesteryl acetate; cholesteryl valerate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from $3\beta$-amino-$\Delta^5$-cholestene and mixtures thereof; peptides such as poly-$\gamma$-benzyl-L-glutamate; derivatives of beta sitosterol such as sitosteryl chloride and amyl esters of cyano benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds.

Typical suitable non-mesomorphic optically active materials include: derivatives of alcohols such as l-menthol, l-linannol, d-mannitol, d-borneol, and d-guercitol; derivatives of ketones such as d-camphor, d-3-methylcyclohexanone, and 1-6-isopropyl-3-cyclohexanone; derivatives of carboxylic acids such as d-citronellic acid, l-citronellic acid, d-chaulmoogric acid, l-campholic acid, l-arabonic acid, d-tartaric acid, and l-ascorbic acid; derivatives of aldehydes such as d-citronellal; derivatives of alkenes such as 1-B-pinane, d-silvesterene, and d-limonene; derivatives of amines such as 1-2-methylpiperidine; derivatives of nitriles such as d-mandelonitrile; derivatives of amides such as d-hydrocarbamide; and mixtures thereof.

Mixtures of the nematic liquid crystalline material and the optically active material can be prepared in organic solvents such as chloroform, petroleum ether, methyl ethyl ketone and the like, which are typically subsequently evaporated from the mixture thereby leaving the liquid crystalline composition. Alternatively, the individual components of the liquid crystalline composition can be combined directly by heating to an appropriate temperature.

The optically negative liquid crystalline composition formed by adding the nematic liquid crystalline substance and an optically active material can be provided in the homeotropic or the homogeneous texture of the nematic mesophase by any suitable method known in the art, such as, for example, aligning agents added to the composition or coated upon substrates and surface treatments such as rubbing.

The aligning agents may be applied to a suitable substrate upon which the layer of optically negative liquid crystalline composition resides or may be added to the mixture of nematic and optically active material or a combination of coatings and additives can be employed.

Any suitable aligning agent can be used. Typical suitable aligning agents include those added to the nematic liquid crystal material such as, for example, additive aligning materials disclosed in U.S. Pat. No. 3,656,834, hereby expressly incorporated by reference, a typical example of which is hexadecyltrimethylammonium bromide. Other typical aligning agents which may be added to the mixture of nematic and optically active material includes the resinous materials enumerated in U.S. Pat. No. 3,803,050, hereby expressly incorporated by reference, which resins include polyamide resins, epoxy resins, and others as enumerated therein; surfactants (surface active agents) such as, for example, esters of polyhydric alcohols, alkorylated amides, esters of polyorypropylene glycols, ethers of polyoxyalkylene glycols, sulfonated hydrocarbons and their salts, heterocyclic amines, amphoterics such as: cetyl betane, sequestrants such as: trisodium nitrilotriacetate and many others as enumerated therein.

The aforementioned aligning agents to be added to the liquid crystalline composition (mixture of nematic and optically active material) are to be added in accordance with the practice disclosed in the aforementioned patents. For example, a suitable range is broadly disclosed as 0.25 percent to about 2.5 percent by weight of the nematic in the former patent; and from about 0.1 and about 10% by weight in the latter patent.

Homeotropic or homogeneous alignment can also be accomplished by coating a suitable substrate upon which the layer of optically negative liquid crystalline material is placed by coating or adding any of the many materials known in the art. Such known coating materials include, for example, silanes such as alcoxysilanes for homoeotropic alignment and additive and coating materials listed in Vol. 61, No. 7, Proceedings of the IEEE, p. 823, July, 1973 in the article "Surface-Produced Alignment of Liquid Crystals" by Kahn, Taylor and Schonhorn; hereby expressly incorporated by reference, for homeotropic and homogeneous alignment. Homogeneous alignment can be accomplished by rubbing the substrate as is well known to those skilled in the art.

Once the optically negative liquid crystalline composition is formed as above described and provided in the homeotropic or homogeneous texture of the nematic mesophase, a voltage or potential is applied at a level sufficient to produce dynamic scattering. The applied voltage will have an electrical field associated with the voltage and the voltage is applied in a manner that provides a direction to the electrical field which is perpendicular to the plane of the layer of liquid crystalline composition; that is, across the thickness of the cell. The voltage level and not the electrical field strength is the important parameter for dynamic scattering. That is, dynamic scattering is dependent upon the amount of voltage and not the thickness of the layer of liquid crystalline composition across which the voltage is applied. Dynamic scattering is well known to and easily recognized by those skilled in the art. When a voltage of such strength is applied in such manner, dynamic scattering is observed. Upon removal of the applied voltage, the liquid crystalline material transforms to the spherulitic texture of which the photograph in FIG. 1 is typically representative.

The voltage level and the time during which the voltage is applied are interdependent with respect to producing a relatively densely packed texture (that is, one at least as densely packed as the spherulites in FIG. 1). For example, substantially total transformation to a densely packed spherulitic texture can be typically obtained with the application of voltage of about 15 volts across a 4 micron thick sample of the liquid crystalline layer for a period of about 1 second. On the other hand, for the same layer, generation of substantially the same packing density in a period of about 0.05 second requires a voltage of about 20 volts. Formation of isolated spherulites can be observed down to the millisecond; by control of voltages and times it is possible to obtain a wide gamut of packing densities ranging from 1 or more small number of spherulites in the liquid crystalline material up to a very dense, closely packed, numerous number of spherulites approaching total transformation of the liquid crystalline material into spherulites. The generation of a closely packed spherulitic texture can also be accomplished by successive application of D.C. pulsed electrical fields, each of which by itself only generates a small number of spherulites. The electrical fields can be conveniently generated by application of D.C. voltages, or low frequency A.C. voltages of less than about 1000 Hz. By "low frequency" is herein meant less than about 1000 Hz.

The novel spherulitic texture thus produced is stable. That is, deterioration with time is not detected. The stable spherulitic texture can conveniently be erased by either mechanically shearing the liquid crystalline layer or by applying a high frequency A.C. electrical field, for example, above about 1000 Hz. The phrase "high frequency" is used herein to mean above about 1000 Hz. Erasure is a one step process when the liquid crystalline composition is returned to an originally homogeneous texture.

The erasure of the spherulitic texture and the return of the liquid crystalline material to its original homeotropic texture state involves a two step process and the interdependence of electrical field strength and period of time during which the electrical field is applied. In the homogeneous case, the homogeneous texture returns immediately upon application of the erasing field. With respect to the two step process, it is observed that during application of the high-frequency A.C. electrical field, or erasing field, the liquid crystalline state observable between crossed polarizers is birefringent and substantially uniform. This state of the liquid crystalline material during application of the erasing electrical field is typically identified as the "Schlieren texture." The actual return to the initial state of the liquid crystalline material begins only after removal of the applied erasing, high frequency A.C. electrical field. The portions of the liquid crystalline material which were initially in the homeotropic texture immediately return to such initial state immediately upon removal of the erasing electrical field. The field of view for such regions becomes dark between crossed polarizers. On the other hand, regions, if any, of the liquid crystalline layer which were not initially homeotropic when regions of interest were homeotropic but which nevertheless were transformed into spherulites or regions containing spherulites, also return to their initial state only upon removal of the high frequency erasing A.C. electrical field, These regions however, return more slowly to their initial state and the period of time required for erasure in these regions is measured in seconds. That is, for such regions less than a minute is typically required for erasure upon removal of the erasing electrical field.

When erasing the spherulitic texture to an initially homogeneous texture, the field of view is dark between crossed polarizers when the axis of polarization of one of the polarizers is placed parallel to the initial direction of the major axes of the molecules. That is, when substrate rubbing is used to provide the homogeneous texture, then that axis of polarization is placed parallel to the direction of rubbing.

With respect to the interdependence of the erasing electrical field and the time required for such erasing electrical field strengths, typical parameters at an A.C. frequency of 2 KHz include the application of 100 volts per mil thickness of the liquid crystalline layer applied for about 1 second and about 133 volts per mil thickness of liquid crystalline layer applied for about ½ second; and further include, at an A.C. frequency of about 2 KHz, the application of about 167 volts per mil thickness of liquid crystalline layer for a period of time of about 1/10 second. Erasure is dependent upon electrical field strength; that is, the voltage level and the thickness across which it is applied. Partial erasure of the stable spherulitic texture can occur if the applied erasing electrical field strength is too low or the period of time during which the erasing electrical field is applied is too short. This is analogous to the interdependence of the amount of voltage and time of its application during the application of D.C. or low frequency A.C. voltages for transformation of the liquid crystalline material from its initial state into the spherulitic texture. It will be appreciated, of course, that by control of the erasure parameters of electrical field strength and time during which it is applied, a wide gamut of packing densities can be obtained by partial erasure of a previously existing densely packed spherulitic texture.

With regard to the stable spherulitic texture of which the photograph in FIG. 1 is typically representative, it is noted that the individual spherulites are birefringent and that the array of spherulites is slightly scattering. By "slightly scattering" as used herein is meant scattering which is less intense than dynamic scattering of the same material, when voltage is applied. The optical phenomena of scattering and dynamic scattering is well known to those skilled in the art. Speaking generally, scattering occurs due to interfaces between two kinds of materials, each of which has a different index of refraction. In dynamic scattering, liquid crystalline material containing many regions of different orientations scatters light intensely. Generally speaking, scattering is caused by light scattering centers which may be either an interface between two different kinds of materials or between different regions of orientations in the same material. With respect to dynamic scattering, this is generally observed in nematic liquid crystalline materials upon application of an electrical field of sufficient strength. Without being under the influence of an aligning agent or an electrical field, nematic molecules in any local area of the layer of nematic liquid crystalline material point in one direction although the orientation differs from area to area.

Upon application of an electrical field across the layer of nematic liquid crystalline material, the molecules of the nematic line up with their long axes at some predetermined relationship to the field direction, depending upon materials, electrical field strength and presence or absence of aligning agents. When the electrical field is of sufficient strength to cause ions to move towards the electrodes by which the electrical field is applied, the ions disrupt the order of alignment of the nematic molecules and create relatively large regions of turbulence. Dynamic scattering results.

The advantageous transformation provided by the instant invention differs fundamentally from the previously reported storage effects in liquid crystalline mixtures of cholesterics and dielectrically negative nematics. The previously reported effects are based upon reversible transformtion between the Grandjean (planar) texture and the focal-conic textures of the cholesteric mesophase. The initial state of the liquid crystalline material in accordance with the advantageous transformation process of the instant invention is the above described aligned state of the nematic doped with optically active materials. This initial state is clear, the optic sign is positive and the overall optical characteristics are that of a nematic. On the other hand, in the previously reported transformations, the initial state is characterized by a negative optic sign and the general optical characteristics are that of a cholesteric. The final spherulitic texture state of the transformation provided by this invention is also very different from the final state of the previously reported transformations. A single layer of spherulites, preferably closely packed, is presented by the spherulitic texture and is readily recognized as being very different from the previously described cholesteric or nematic texture.

Interesting, reproducible effects were observable during experimentation and characterized the liquid crystalline material in which the spherulitic texture is created. These characteristics are set forth immediately below for the nematic methoxy benzylidene-p'-n butylaniline (MBBA) doped with cholesteryl oleyl carbonate (COC) in the amount of about 2.2 percent by weight and placed in an unsealed cell consisting of two flat, rectangular, indium oxide coated glass plates separated by about 0.15 mil Mylar spacer. A thin film of alcoxysilane was overcoated upon the indium oxide coating of the glass plates. The doped nematic was sandwiched between the alcoxysilane films and the indium oxide coatings were electrical connected to a D.C. voltage source. Although the observations reported here refer to the particular doped nematic, very similar observations were made with different liquid crystalline mixtures. Some of the below reported parameters varied somewhat, of course, for the particular mixture utilized.

The particular unsealed cell constructed as above was experimented with and it was determined that under the influence of D.C. electrical fields, two distinct regions are observable: (a) at voltages smaller than required for dynamic scattering, all electro-optic effects are transient. The cell returns to its initial state after field removal; and, (b) if the applied voltage is sufficient to produce dynamic scattering, the entire cell transforms to the stable spherulitic texture upon removal of the applied voltage and exhibits dynamic scattering during the application of such voltage. With the voltage setting at about 2.0 volts the liquid crystalline material becomes birefringent and at about 3.0 volts striations appear which bear similarities to both Williams domains and large pitch focal-conic textures. As the voltage is increased, a branching effect is observable between about 4 to about 6 volts with short branches growing from the main filaments. At about 7.0 volts, swirling begins. Turning off the voltage at this point, i.e., removing the electrical field, results in formation of the first domains of spherulites. When the voltage is increased to about 12.0 volts, and at higher voltages, the liquid crystalline material becomes dynamically scattering. Upon removal of such dynamic scattering voltages, first branching, then circular motion, and finally formation of relatively closely packed spherulites are observed all across the cell. The spherulites typically have diameters of from about 5 microns to about 100 microns with some minor deviation occurring for any one sample. Between crossed polarizers it was observed that the spherulites were birefringent and that the liquid crystalline material between spherulites were in the homoeotropic texture of the nematic mesophase. Dense packing of the spheres generates a hexagonal structure which becomes most evident between parallel polarizers. These events were also observable with the low frequency A.C. electrical fields, including the formation of the spherulitic texture.

During experimentation, it was determined that the helical pitch (p) and the thickness of the layer of liquid crystalline composition provided on a substrate in contact with an aligning agent is critically interdependent to the formation of the novel spherulitic texture. As indicated in Table I below, the ratio of the helical pitch of the optically negative liquid crystalline composition to the thickness of the layer thereof on the substrate and in contact with the aligning agent must be within the range of about 1 to about 10. Ratios within the range of from about 3.5 to about 5 are preferred because such ratios yield a stable spherulitic texture having a packing density of spherulites at least substantially approaching the packing density depicted in the photograph of FIG. 1. Ratios within the ranges of from about 1 to about 3.5 and from about 5 to about 10 produce a spherulitic texture which has a relatively low packing density of spherulites. This is illustrated in Table I below which lists typical cell thicknesses and helical pitches, as above described, both in microns. The helical pitch is read along horizontal lines and the cell thicknesses are read along vertical lines; the intersection denotes the combination of helical pitch and cell thickness utilized in a typical attempt to form the novel spherulitic texture of the instant invention. The designation P stands for preferred, indicating the formation of spherulites with a packing density substantially approaching that represented by the photograph of FIG. 1. The designation S, indicating satisfactory results, stands for a packing density of about ½ that represented in the photograph of FIG. 1, or a lesser packing density. Combinations of helical pitch and cell thickness other than those designated by either capital letter P or capital letter S did not form stable spherulites.

TABLE I

| PITCH ($p$) | CELL THICKNESS ($\mu$) | | | |
|---|---|---|---|---|
| | 4 | 12 | 19 | 25 |
| 100 | | | P | P |
| 60 | | P | P | S |
| 40 | S | P | S | |
| 15 | P | S | | |

For the production of spherulites having a satisfactory packing density, the helical pitch can satisfactorily be in the range of from about 5 microns to about 200 microns and the cell thickness can satisfactorily be in the range of from about 1 micron to about 100 microns. For the production of spherulites having a preferred density, the helical pitch is preferably within the range of from about 15 microns to about 100 microns and the cell thickness is preferably within the range of from about 4 microns to about 25 microns. Spherulites can be produced with helical pitches outside the range of from about 5 microns to about 200 microns and with cell thicknesses outside the range of about 1 micron to about 100 microns, provided the ratio of helical pitch to cell thickness is within the range of from about 1 to about 10. It will be appreciated, of course, that the cell thickness in microns is equal to the thickness of the layer of liquid crystalline composition. Therefore, the satisfactory ranges and preferred ranges for cell thicknesses are the satisfactory and preferred ranges, respectively, for layers of liquid crystalline composition employed in accordance with the instant invention.

Figure 2:
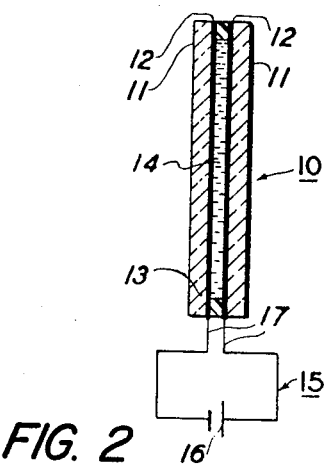
FIG. 2 is a cross-sectional view of a liquid crystalline imaging member.

In FIG. 2 a typical liquid crystalline imaging member 10, sometimes referred to as an electroded imaging sandwich, is shown in cross-section wherein a pair of transparent plates 11 having substantially transparent conductive coating 12 upon the contact surface, comprise a parallel pair of substantially transparent electrodes. An imaging member wherein both electrodes are transparent is preferred where the imaging member is to be viewed using transmitted light; however, a liquid crystalline imaging member may also be viewed using reflected light thereby requiring only a single transparent electrode while the other may be opaque. The transparent electrodes are separated by spacing member 13 which contains voids which form one or more shallow cups which contain the liquid crystalline film or layer which comprises the active element of the imaging member. A field is created between the electrodes by an external circuit 15 which typically comprises a source of potential 16 which is connected across the two electrodes through leads 17. The potential source may be either D.C., A.C. or a combination thereof; and is preferably variable with respect to the application of A.C., D.C. voltage levels and A.C. frequencies (hereinafter referred to as variable voltage source).

In the liquid crystal imaging members described in FIG. 2, the electrodes may be of any suitable transparent, conductive material. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings are typically evaporated onto the more insulating transparent substrate. NESA glass, a tin oxide coated glass manufactured by the Pittsburgh Plate Glass Company, is a commercially available example of a typical transparent conductive electrode material.

The spacer, 13 of FIG. 2, which separates the transparent electrodes and contains the liquid crystal film between said electrodes, is typically chemically inert, transparent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, and mixtures thereof.

Figure 3:
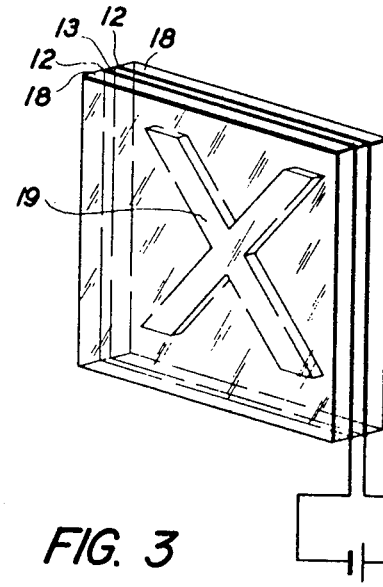
FIG. 3 is an isometric view of an embodiment of a liquid crystalline imaging member wherein the desired image is defined by the shape of the spacing member.

In FIG. 3 the embodiment of the liquid crystal imaging member described in FIG. 2 is shown with the desired image defined by the shape of the void areas in the spacer gasket 13. As before, transparent electrodes 18 are separated by the spacer 13, but the entire desired image area 19 comprises the liquid crystal film or layer. In this embodiment the entire inner faces of the transparent electrodes comprise substantially transparent conductive coating 12 and the conductive coatings are electrically connected to external circuit 15. In operation there is an electrical field across the entire area of the spacer 13, however, the image caused by the electrical field-induced transition in the liquid crystal film, occurs only in the area 19 where the liquid crystal film is present. Again here, depending upon whether the desired image is to be viewed by transmitted or reflected light, both or only one of the electrodes, respectively, may be transparent.

Figure 4:
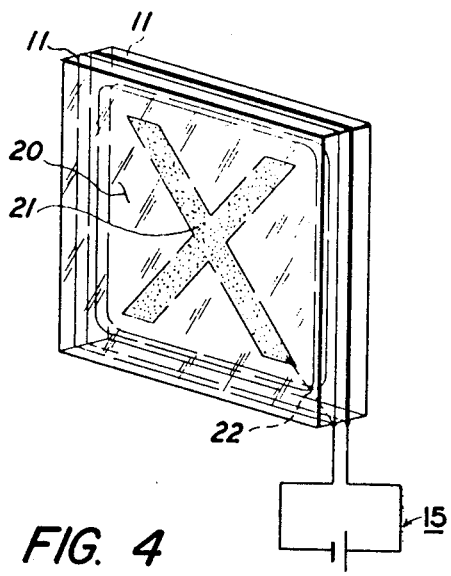
FIG. 4 is an isometric view of an embodiment of a liquid crystalline imaging member wherein the desired image is defined by the shape of at least one of the electrodes.

In FIG. 4 another preferred embodiment of the liquid crystal imaging member described in FIG. 2 is shown. In FIG. 4 the desired image is defined by the shape of an electrode, and therefore by the shape of the corresponding electrical field. The imaging member here comprises transparent plates 11 separated by spacer gasket 13 having void area 20 filled with liquid crystalline composition and comprising substantially the entire area of spacer layer 13. The desired image is defined by the shape of the substantially transparent conductive coating shown at 21, which is affixed to the inner surface of one or both of the transparent support plates 11, and is affixed only in the desired image configuration. The embodiment illustrated in FIG. 4 shows only one of the two electrodes in image configuration, however it will be understood by those skilled in the art that both electrodes could easily be made in a matched pair to define the same desired image. When the single image electrode configuration is used, the second electrode will comprise transparent plate 11 with substantially transparent conductive coating 12 upon the entire area of the inner surface of the transparent electrode. It is noted that a very thin, or substantially invisible conductor 22 is necessary in this embodiment to electrically connect the electrode in the desired image configuration to external circuit 15 which is similarly connected to the conductive coating of the opposite electrode. In operation this embodiment will produce an electric field only in areas where there are parallel electrodes, i.e., between the electrode in the desired image configuration, and the opposite electrode, whether or not the second electrode is also in the desired image configuration. Again here, one of the electrodes may be opaque if it is desired to observe the imaged member by reflected light rather than transmitted light.

Figure 5:
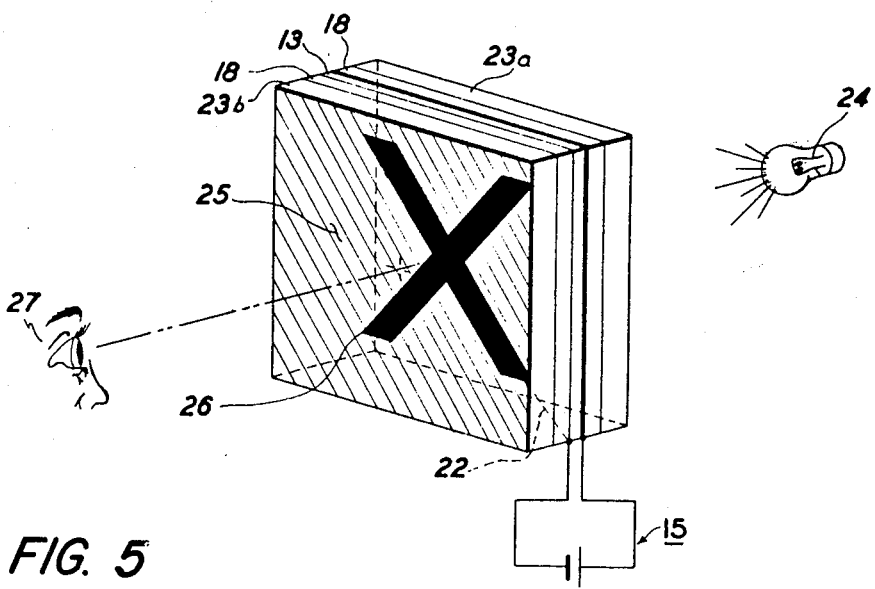
FIG. 5 is an isometric view of an embodiment wherein a typical liquid crystalline imaging member is viewed between polarizers.

In FIG. 5 a liquid crystal imaging member comprising a pair of substantially transparent electrodes 18 sandwiching a spacer 13 containing a liquid crystal film is shown being observed between polarizers 23. As described earlier, the spherulites in the spherulitic texture are typically birefringent thereby rendering the transformed portion of the liquid crystalline film substantially transparent to transmitted light when viewed between crossed polarizers. At the same time, those areas remaining in the homeotropic state remain dark between crossed polarizers. When such a liquid crystalline imaging sandwich is observed between polarizers, light from source 24 is plane polarized while passing through polarizer 23a. A viewer 27 sees the light which passes through polarizer 23b which originated from source 24 and passed through the spherulitic image portion 26. Although the light was polarized by polarizer 23a in a plane crossed with the plane of polarizer 23b, the birefringent effect of the spherulites between the substantially transparent electrodes is sufficient to allow some of the originally plane-polarized light to pass through polarizer 23b. However, in the non-image areas 25, the effect of polarizers 23, when said polarizers have their respective planes of polarization crossed, is to cut off the light transmitted through polarizer 23a and non-image area 25 so that the non-image area 25 appears dark. When area 25 is homeotropic the orientation of the polarizer is incidental whereas in the homogeneous case maximum contrast will be produced when the incident plane polarized light is either parallel or perpendicular to the alignment direction (e.g., the direction of rubbing of the substrate).

Although the embodiment of the advantageous system of the present invention illustrated in FIG. 5 shows observation between polarizers, it will be appreciated that any other means for enhancing the contrast between image and non-image areas may perform the same function as the polarizers in the illustrated embodiment. For example, in addition to polarizers, an edge-lighting system wherein the spherulitic texture in imaged areas scatters the light entering the imaging member from its edge, so that only the light scattering areas are visible while the homoeotropic or homogeneous nematic areas remain transparent, may be used. It is therefore clear that any desired image may be created in dark-on-light or light-on-dark image-background combinations.

Figure 6:
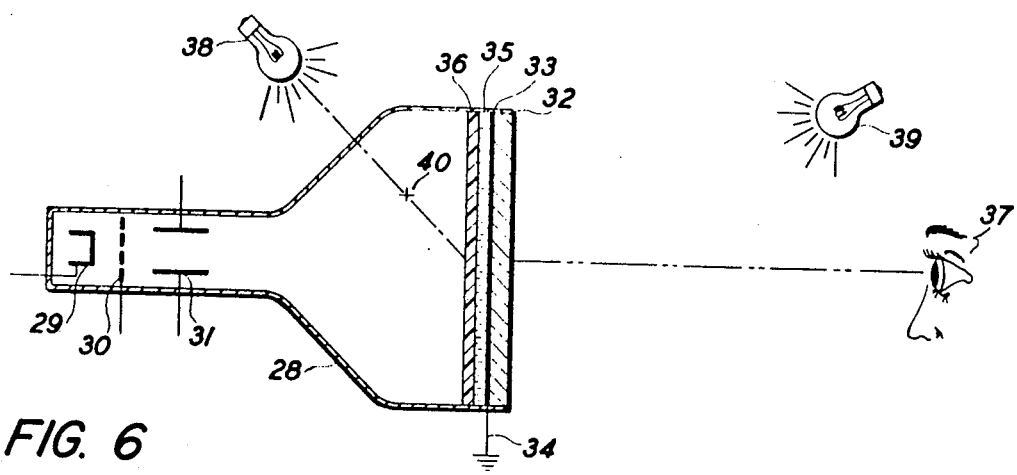
FIG. 6 is a cross-sectional view of an imaging system wherein a liquid crystalline imaging member is imaged by an electron beam address system.

In FIG. 6 another preferred embodiment of the advantageous system of the present invention is illustrated wherein an electron beam address system is provided for the generation of an imagewise field across a liquid crystalline imaging member. In FIG. 6 the electron beam address system is within vacuum tube 28, and the address system itself comprises electron gun 29, accelerator 30 and deflector 31 which are provided with electrical leads through vacuum tube 28 so that suitable electrical circuitry may be connected therewith to operate the electron beam imaging system. The liquid crystalline imaging member in conjunction with the electron beam address system comprises substantially transparent substrate 32 upon which substantially transparent conductive coating 33 is affixed. Substantially transparent coating 33 is also grounded at 34. The liquid crystalline imaging layer 35 may be coated directly onto substantially transparent conductive layer 33, provided the liquid crystalline material has a sufficiently high viscosity to support itself on a surface even when the surface is oriented vertically or horizontally with the liquid crystalline imaging layer on the lower surface of such horizontal imaging member. Alternatively, transparent insulating layer 36 may be placed over the liquid crystalline imaging layer 35 to protect and support the liquid crystalline material. The impingement of electrons is directed from electron gun 29 and impinging upon layer 36 or liquid crystalline imaging layer 35 creates a momentary field when taken in conjunction with grounded transparent conductive layer 33. This momentary field across liquid crystalline layer 35 causes the texture transition of the advantageous system of the present invention, thereby creating an image visible to an observer 37.

Another embodiment of the electron beam address system is a configuration wherein the electric field created by the electron beam is transmitted through a thin layer which is substantially insulating in the lateral directions parallel with the plane of said layer, but is substantially conductive through the thickness of said layer in the direction perpendicular to the plane of the layer (i.e., a pin tube). This embodiment permits the liquid crystalline layer to be outside the vacuum system. For transient displays using this embodiment of the electron beam address system, the face plate is substantially insulating in all directions.

It will also be appreciated that the electron beam address system may be used in conjunction with an electroded liquid crystalline imaging member wherein the sum of the fields created by the electrode system and the electron beam address system is sufficient to create a total voltage greater than that required for dynamic scattering of the particular liquid crystalline imaging composition. Similarly, any suitable combination of address systems including any of the other systems disclosed herein and even others, may be combined in the same manner so that the total field created by the combination of address systems has a field strength value equal to or greater than that required for the creation of spherulites in the particular composition used.

Again here it is noted that the sources of potential used in the circuits which produce the electrical fields in the various address systems suitable for use with the advantageous system of the present invention, may be either A.C. or D.C. or combinations thereof, as previously described.

The electron beam address system does not itself illuminate the image which it creates. However, external sources of light 38 and 39 are illustrated to show that the liquid crystalline imaging member comprising the face of vacuum tube 28 may be observed by light transmitted, as from light source 38, or reflected, as from light source 39. Alternatively, transmitted light may originate from a source placed inside vacuum tube 28 at a location indicated, for example, at point 40. However, the in-tube source of illumination should be so placed as to not interfere with the electron beam which creates the image on the face of the tube.

In related embodiments, the substantially insulating overlayer 36 may be selected from materials which may exhibit secondary emission effects when bombarded by the initial electron beam, and such secondary emissions may be the imaging emissions, or, alternatively, the secondary emission system may be suitable as a method for erasing the previous image on the liquid crystalline imaging member.

Figure 7:
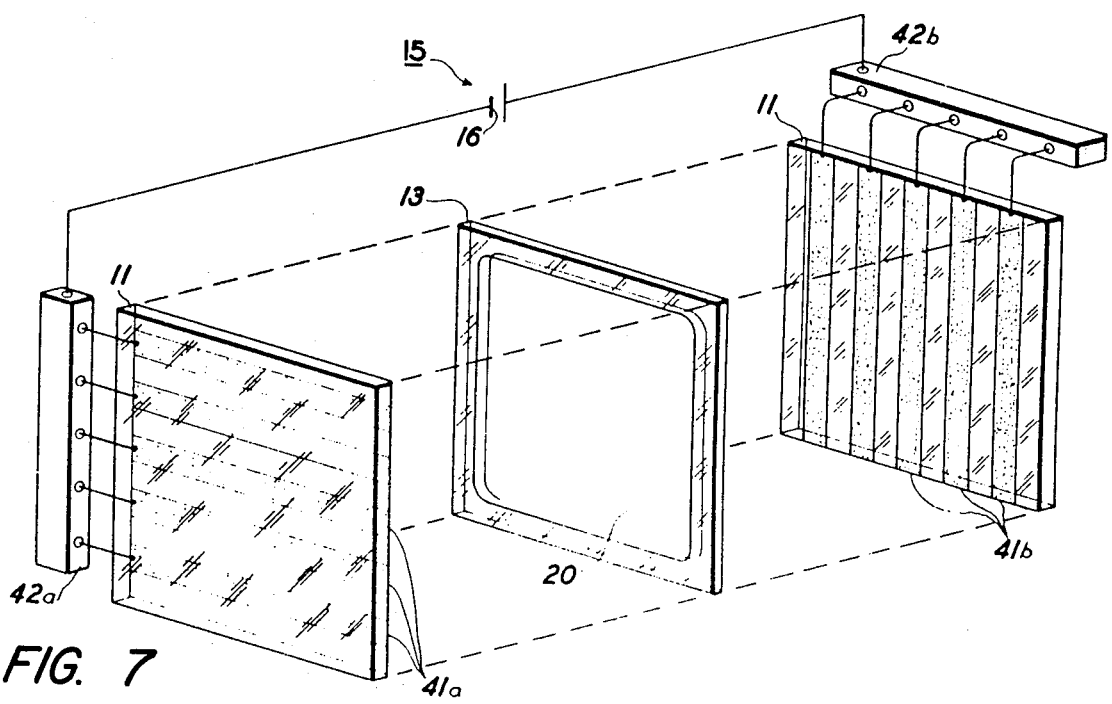
FIG. 7 is an exploded isometric view of an imaging system wherein a liquid crystalline imaging member is imaged by an X–Y address system.

In FIG. 7 an X–Y address system suitable for imaging a liquid crystalline imaging member is illustrated in exploded isometric view. The liquid crystalline imaging film is placed in void area 20 within the transparent and substantially insulating spacer gasket 13. The liquid crystalline film and spacer 13 are sandwiched between a pair of substantially transparent electrodes comprising transparent support plates 11 upon which strips of substantially transparent, conductive material 41 is coated. The substantially transparent electrodes are oriented so that conductive strips 41b and conductive strips 41a on the respective electrodes cross each other in an X–Y matrix or grid. Each conductive strip in each set of parallel strips 41a and 41b, is electrically connected to a circuit system 42 which is suitable for selective or sequential operation. Through selection systems 42 and external circuit 15 including source of potential 16, an electric field suitable for creating the homoeotropic or homogeneous spherulitic texture transition of the advantageous system of the present invention can be created across selected points or a selected sequence of points in the illustrated imaging system. It will be understood that substantially transparent conductive strips 41 may vary in width from a very fine, wire-like structure to any desired strip width. In addition, one support plate 11 may be opaque where the imaging system is to be observed from one side, using only reflected light.

Figure 8:
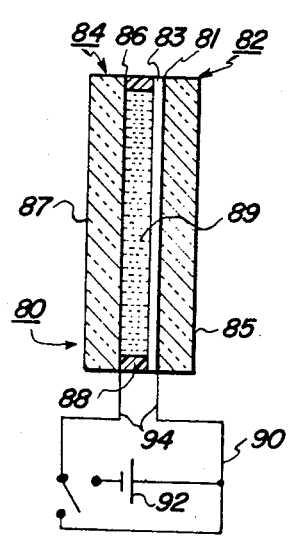
FIG. 8 is a partially schematic cross-sectional view of a liquid crystalline imaging member wherein at least one of the electrodes has a photoconductive surface.

FIG. 8 depicts a liquid crystalline electro-optic imaging cell wherein one of the electrodes comprises a photoconductor and imaging is effected by applying a uniform potential across the entire area of the electrodes and subsequently exposing the photoconductor to an imagewise pattern of activating electromagnetic radiation corresponding to a desired image configuration. Referring now to FIG. 8 there is seen an electro-optic imaging cell, generally designated 80, where in a pair of plates, generally designated 82 and 84, respectively, comprise a parallel pair of electrodes at least one of which is substantially transparent. For purposes of illustration both electrodes are shown as being transparent. Electrode 82 is made up of a photoconductive insulating material layer 83 overlying a conductive substrate which in this instance is shown as a substantially transparent conductive layer 81 deposited on a substantially transparent support member 85. Electrode 84 is shown as a substantially transparent conductive layer 86 deposited on substantially transparent substrate 87.

When it is desired to view the electro-optic cell using transmitted light it is preferred that both electrodes be substantially transparent. Of course, in this instance there is required a photoconductive insulating material layer which is substantially transparent to the viewing electromagnetic radiation. Typical suitable substantially transparent photoconductive materials include, for example, relatively thin, e.g., about 5 microns, layers of selenium. However, the electro-optic imaging cell may also be viewed using reflected light thereby requiring only a single transparent electrode while the other may be opaque. In this instance one of the electrodes is preferably made up of an opaque photoconductive insulating layer deposited on an opaque substrate which may be any suitable conducting material such as a metallic layer.

The transparent electrodes are separated by spacing member 88 which contains voids which form one or more shallow cups which contain the liquid crystalline film or layer 89. The electrodes are connected to opposite terminals of an external circuit 90 which typically comprises a source of potential 92 which is connected across the two electrodes through leads 94. When a potential is applied to the conducting surface 81 of electrode 82 in the dark no current will flow since layer 83 is insulating under these conditions. However, when the imaging cell is exposed to an imagewise pattern of activating radiation, the light-struck areas of photoconductive insulating layer 83 become conductive causing current to flow in the light-struck areas.

Figure 9:
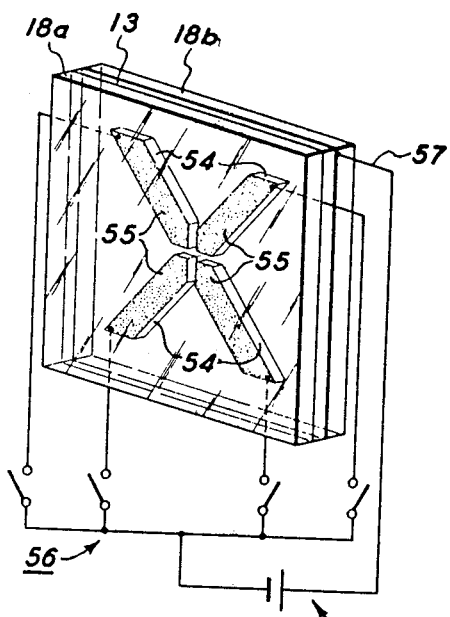
FIG. 9 is an isometric view of a uni-planar, multiple cell, liquid crystalline imaging member.

FIG. 9 illustrates a uni-planar, multiple cell, liquid crystalline imaging member suitable for use with the electrically induced texture transition imaging system of the present invention. In the imaging member of FIG. 9 the substantially transparent electrodes 18 are separated by the typical spacer gasket 13 which contains voids 54 which contain the liquid crystal film. Corresponding areas 55 are the shaped substantially transparent, conductive coating on the inner surface of electrode 18a. Each one of these cells 55 is capable of being selectively imaged either individually or jointly as desired, through the use of switching system 56 in external circuit 15 which is also connected to the substantially transparent conductive layer on the inner surface of substantially transparent electrode 18b, by electrical lead 57. It will be appreciated that uni-planar, multiple cell, imaging members such as the one in FIG. 9 may be designed so that various combinations of the desired image cells may be imaged to create any desired figure or character in any language or number system. It will also be appreciated that either a character shaped spacer as described in FIG. 3, or a character-shaped electrode system as described in FIG. 4, in addition to the combination shaped spacer and electrode system here described in FIG. 9 can be used in such a uni-planar, multiple image system.

The following examples further specifically define the present invention with respect to formation and erasure of the novel spherulitic texture. The parts and percentages are by weight unless otherwise indicated. The examples below are intended to illustrate various preferred embodiments.

EXAMPLES

In all of the examples, flat rectangular glass plates are coated on one side with indium oxide. Each of the oxide coatings are provided with an electrical lead for connection to a terminal of a suitable voltage source. In Examples I–X, the indium oxide coatings are overcoated with a thin coating of alcoxysilane. Cells are constructed by placing the glass plate in a parallel relationship, spaced apart by a Mylar spacer, coated sides oppositely facing one another.

EXAMPLE I

A composition of about 2.2 percent by weight cholesteryl oleyl carbonate (hereafter COC) and p-methoxy-benzylidene-p'-n-butylaniline (hereafter MBBA) is placed in a cell provided with alcoxysilane coatings and an about 4 micron thick spacer. A D.C. voltage of about 15 volts is applied across the cell for about 1 second and removed. Upon removal, a densely packed spherulitic texture is observed between crossed polarizers comprising the spherulites of FIG. 1 surrounded by the composition in the homoeotropic texture of the nematic mesophase.

EXAMPLE II

The spherulitic texture of Example I is completely erased. About 40 volts A.C. peak to peak voltage at a frequency of about 2 KHz is applied for about 0.5 seconds and removed. Upon removal, the homeotropic texture of the nematic mesophase is observed between crossed polarizers throughout the composition.

EXAMPLE III

Example I is repeated and the resulting spherulitic texture completely erased in accordance with the procedures, and with the results of, Example II. However, about 30 volts A.C. peak to peak voltage at about 2KHz is applied for about 1 second and removed. Upon removal of the voltage, the spherulites disappear.

EXAMPLE IV

Example I is repeated and the resulting spherulitic texture only partially erased by applying about 80 volts A.C. peak to peak voltage at about 2KHz for about 0.1 second. Upon removal of the A.C. voltage spherulites are observed between crossed polarizers but are reduced in number. The remainder of the composition is in the homoeotropic texture of the nematic mesophase.

EXAMPLE V

A composition of about 2.0 percent by weight cholesteryl nonanoate and MBBA is placed in a cell provided with alcoxysilane coatings and an about 4 micron thick spacer. A D.C. voltage of about 15 volts is applied across the cell for about 1 second and removed. Upon removal, a densely packed spherulitic texture is observed between crossed polarizers comprising the spherulites of FIG. 1 surrounded by the composition in the homoeotropic texture of the nematic mesophase.

EXAMPLE VI

A spherulitic texture less densely packed than that of Example I is obtained by following Example I except that a D.C. voltage of about 10 volts is applied for about 0.5 seconds.

EXAMPLE VII

Example I is repeated to obtain a less densely packed spherulitic texture by applying a D.C. voltage of about 20 volts for about 0.1 second.

In Examples VIII–X, Example I is followed to provide densely packed spherulites surrounded by the composition in the homoeotropic texture except that the percentage of COC the spacer thickness, the amount of D.C. voltage and the time during which the D.C. voltage is applied are about the values listed below in Table II.

TABLE II

| Example | % COC | Spacer Thickness (microns) | D.C. Voltage (volts) | Time (secs.) |
|---------|-------|----------------------------|----------------------|--------------|
| VIII    | 0.4   | 25                         | 12                   | 3            |
| IX      | 0.7   | 19                         | 12                   | 3            |
| X       | 1.0   | 12                         | 12                   | 3            |

EXAMPLE XI

The indium oxide coatings of a cell are rubbed in accordance with the Chatelain technique and the cell assembled with a composition of about 0.7 percent by weight COC and MBBA and a spacer thickness of about 25 microns. The homogeneous texture of the nematic mesophase is observed between crossed polarizers, the axis of polarization of one of which is parallel to the direction of rubbing.

A D.C. voltage of about 12 volts is applied across the cell for about three seconds and removed. Upon removal of the applied voltage, densely packed spherulites are observed (between the polarizers crossed and oriented as above). The spherulites are surrounded by the composition in the homogeneous texture of the nematic mesophase.

EXAMPLE XII

The spherulitic texture of Example XI is immediately erased upon application of about 30 volts A.C. peak to peak voltage at about 2 KHz.

It will be appreciated that other variations and modifications will occur to those skilled in the art upon a reading of the present disclosure. These are intended to be within the scope of this invention.

For example, it will be appreciated that when transmission viewing is desired both electrodes are to be transparent to the wavelength of light employed.

Similarly, when reflection viewing is desired, then one of the electrodes is transparent and the other provided, if required, with a reflective coating to insure adequate reflection of the wavelengths of light employed. It will be understood that transmission viewing embodiments of this invention can be utilized in reflection viewing in accordance with the practice described.

It will be further appreciated that only a particular region or portion of the layer of liquid crystalline composition, of interest, need be provided initially in the homoeotropic or homogeneous texture of the nematic mesophase and transformed into the novel, spherulitic texture of the present invention in accordance with the practice of the present invention.

While we have spoken in terms of applied voltage or potential with respect to the method of forming the spherulitic texture, we have described the texture transformation as electrically induced, and have indicated the desirability of using a voltage or potential of sufficient magnitude to cause dynamic scattering, it will be appreciated by those skilled in the art that these descriptions are all interrelated in that dynamic scattering is caused by current flow. Thus, a voltage preferably sufficient to cause dynamic scattering is one by virtue of which current flows through the liquid crystalline composition wherein dynamic scattering is produced. Accordingly, since current flow is utilized to induce the texture transformation the texture transformation is herein referred to above as an electrically induced transformation.

Further, while FIGS. 2–9 are described in terms of applied electrical field, it will be appreciated by those skilled in the art that the fields described for imaging with texture transformation are those associated with voltage application and that, in accordance with the method of effecting the texture transformation into the spherulitic texture as described hereinabove, the voltage applications are preferably sufficient to create dynamic scattering.

Finally, in contra-distinction to the last two paragraphs, the erasing step utilizing high frequency A.C. voltage is an electrical field effect and, as described hereinabove, the high frequency electrical field strength is a parameter which effects erasure.

What is claimed is:

1. A method of producing a stable spherulitic liquid crystalline texture, comprising:
   a. providing an optically negative liquid crystalline composition comprising a dielectrically negative nematic liquid crystalline material and from about 0.4 to about 3 percent by weight of an optically active material, said optically negative composition having a light reflection band centered about $\lambda_o$ equal to 2np, where $n$ equals the index of refraction and $p$ equals the helical pitch of said optically negative liquid crystalline material;
   b. providing on a substrate, a layer of said liquid crystalline composition with at least a portion of said layer in the homeotropic or homogeneous texture of the nematic mesophase; said layer having a thickness which provides a ratio of said helical pitch to layer thickness of from about 1 to about 10;
   c. applying a voltage potential across said layer portion at a voltage level and for a period of time wherein upon removal of said applied voltage spherulites are formed; and
   d. removing said voltage potential whereby spherulites are produced at least within said layer portion.

2. The method according to claim 1 wherein said layer portion in step (b) is homeotropic further including the step (e) of applying an A.C. electrical field at a frequency of at least about 1000 Hz, and at an electrical field strength and for a period of time wherein when said A.C. electrical field at least about 1000 Hz is removed at least some of said spherulites disappear, and further including the step (f) of removing said applied A.C. electrical field at at least about 1000 Hz.

3. The method of claim 1 wherein said layer portion in step (b) is homogeneous and further including the step (e) of applying an A.C. electrical field at a frequency of at least about 1000 Hz and at an electrical field strength sufficient to cause at least some of said spherulites to disappear.

4. The method of claim 3 wherein said aligning agent is added to said liquid crystalline compositions.

5. The method of claim 3 wherein said aligning agent is coated upon said substrate.

6. The method of claim 5 wherein said aligning agent coated upon said substrate comprises alcoxysilane.

7. The method according to claim 6 wherein said dielectrically negative nematic liquid crystalline material comprises methoxybenzylidene-p'-n butylaniline.

8. The method according to claim 7 wherein said optically acitve material is selected from the group consisting of cholesteryl oleyl carbonate, cholesteryl chloride, and mixtures thereof.

9. The method of claim 1 wherein said step (b) of providing on a substrate, a layer of said liquid crystalline composition with at least a portion of said layer in the homeotropic or homogeneous texture of the nematic mesophase comprises the step of contacting said liquid crystalline composition with an aligning agent.

10. The method according to claim 1 wherein said helical pitch is from about 5 microns to about 200 microns.

11. The method according to claim 10 wherein said helical pitch is from about 15 to about 100 microns.

12. The method according to claim 1 wherein said layer thickness is from about 1 micron to about 100 microns.

13. The method according to claim 12 wherein said layer thickness is from about 4 microns to about 25 microns.

14. The method of claim 1 wherein said applied voltage is applied in imagewise configuration.

15. The method according to claim 14 wherein said imagewise configured applied voltage is created by an electrical X-Y address system and wherein said spherulites produced in step (d) upon removal of said imagewise configured applied voltage are in imagewise configuration corresponding to said imagewise configured applied voltage.

16. The method according to claim 14 wherein said imagewise configured applied voltage is applied by means of a shaped electrode.

17. The method as defined in claim 1 wherein said layer of liquid crystalline composition is provided between a pair of electrodes at least one of which is substantially transparent and at least one of which includes a photoconductive surface and said imagewise applied voltage in step (c) is created by applying a potential to said electrodes and exposing said photoconductive surface to an imagewise pattern of activating electromagnetic radiation.

18. The method according to claim 1 wherein said ratio of helical pitch to layer thickness is from about 3.5 to about 5.

19. The method according to claim 1 wherein said layer of liquid crystalline composition provided on said substrate is provided in an imagewise configuration.

20. The method according to claim 1 wherein the layer of liquid crystalline composition is used with means for enhancing contrast between spherulites produced within said layer portion and other portions of said layer of liquid crystalline composition.

21. The method according to claim 20 wherein the layer of liquid crystalline composition is viewed between polarizers.

22. On a substrate: a layer of liquid crystalline composition comprising a dielectrically negative nematic liquid crystalline material and from about 0.4 to about 3 percent by weight of an optically active material, said liquid crystalline composition when out of contact with an aligning agent or treated substrate being optically negative and having a light reflection band centered about $\lambda_o = 2np$ where $n =$ index of refraction and $p =$ helical pitch of said liquid crystalline composition, said liquid crystalline composition when in contact with an aligning agent or treated substrate in the homeotropic or homogeneous texture of the nematic mesophase; the ratio of said helical pitch to the thickness of said layer being from about 1 to about 10; and, an aligning agent or treated substrate in contact with said layer of liquid crystalline composition.

23. The layer of liquid crystalline composition according to claim 22 wherein said layer is in imagewise configuration.

24. The layer of liquid crystalline composition according to claim 22 wherein said layer is in contact with an aligning agent coated upon said substrate.

25. The layer of liquid crystalline composition according to claim 22 wherein said layer is in contact with an aligning agent dispersed within said layer of liquid crystalline composition.

26. The layer of liquid crystalline composition according to claim 22 wherein said dielectrically negative nematic liquid crystalline material comprises methoxybenzilidene-p'-n butylaniline.

27. The layer of liquid crystalline composition according to claim 26 wherein said optically active material is selected from the group consisting of cholesteryl oleyl carbonate, cholesteryl nonanoate, and mixtures thereof.

28. The layer of liquid crystalline composition according to claim 27 wherein said ratio of helical pitch to layer thickness is from about 3.5 to about 5.

29. The layer of liquid crystalline composition according to claim 28 wherein said helical pitch is from about 5 to about 200 microns.

30. The layer of liquid crystalline composition according to claim 29 wherein said helical pitch is from about 15 to about b 100 microns.

31. The layer of liquid crystalline composition according to claim 28 wherein said layer thickness is from about 1 to about 100 microns.

32. The layer of liquid crystalline composition according to claim 31 wherein said layer thickness is from about 4 to about 25 microns.

33. The layer of liquid crystalline composition according to claim 22 wherein the ratio of said helical pitch to said layer thickness is from about 3.5 to about 5.

34. The layer of liquid crystalline composition according to claim 22 wherein said helical pitch is from about 5 to about 200 microns.

35. The layer of liquid crystalline composition according to claim 34 wherein said helical pitch is from about 15 to about 100 microns.

36. The layer of liquid crystalline composition according to claim 22 wherein said layer thickness is from about 1 to about 100 microns.

37. The layer of liquid crystalline composition according to claim 36 wherein said layer thickness is from about 4 to about 25 microns.

38. On a substrate: a layer of liquid crystalline composition comprising a dielectrically negative nematic liquid crystalline material and from about 0.4 to about 3 percent by weight of an optically active material, said liquid crystalline composition when out of contact with an aligning agent or treated substrate being optically negative and having a light reflection band centered about $\lambda_0$ equal to $2np$, where $n$ = index of refraction and $p$ = helical pitch of said liquid crystalline composition, said liquid crystalline composition when in contact with an aligning agent or treated substrate being in the homeotropic or homogeneous texture of the nematic mesophase, said liquid crystalline composition when in the homeotropic or homogeneous texture of the nematic mesophase capable of undergoing electrically induced transition into a spherulitic texture upon removal of an applied voltage; the ratio of said helical pitch to the thickness of said layer being from about 1 to about 10; an aligning agent or treated substrate in contact with said layer of liquid crystalline composition; and, within said layer of liquid crystalline composition, at least one spherulite, said spherulite lacking the optical characteristics of the homoeotropic or homogeneous texture of the nematic mesophase and being surrounded by said liquid crystalline composition having the optical characteristics of the homeotropic or homogeneous texture of the nematic mesophase.

39. The layer of liquid crystalline composition according to claim 38 wherein said at least one spherulite of liquid crystalline composition has a diameter substantially equal to said layer thickness.

40. The layer of liquid crystalline composition according to claim 38 wherein said diameter is from about 10 to about 70 microns.

41. The layer of liquid crystalline composition according to claim 38 further including a plurality of spherulites of said liquid crystalline composition, said plurality of spherulites lacking the optical characteristics of the homeotropic or homogeneous texture of the nematic mesophase and being separated one from the other by said liquid crystalline composition having the optical characteristics of the homeotropic or homogeneous texture of the nematic mesophase.

42. The layer of liquid crystalline composition according to claim 41 wherein said plurality of spherulites is in imagewise configuration.

43. The layer of liquid crystalline composition according to claim 41 wherein said layer of liquid crystalline composition is in imagewise configuration.

44. The layer of liquid crystalline composition according to claim 38 wherein said layer is in imagewise configuration.

45. The layer of liquid crystalline composition according to claim 38 wherein said layer is in contact with an aligning agent coated upon said substrate.

46. The layer of liquid crystalline composition according to claim 38 wherein said layer is in contact with an aligning agent dispersed within said layer.

47. The layer of liquid crystalline composition according to claim 38 wherein said dielectrically negative nematic liquid crystalline material comprises methoxy benzylidene-p'-n butylaniline.

48. The layer of liquid crystalline composition according to claim 47 wherein said optically active material is selected from the group consisting of cholesteryl oleyl carbonate, cholesteryl nonanoate, and mixtures thereof.

49. The layer of liquid crystalline composition according to claim 48 wherein said ratio of helical pitch to layer thickness is from about 3.5 to about 5.

50. The layer of liquid crystalline composition according to claim 38 wherein said ratio of helical pitch to layer thickness is from about 3.5 to about 5.

51. The layer of liquid crystalline composition according to claim 38 wherein said helical pitch is from about 5 to about 200 microns.

52. The layer of liquid crystalline composition according to claim 51 wherein said helical pitch is from about 15 to about 100 microns.

53. The layer of liquid crystalline composition according to claim 38 wherein said layer thickness is from about 1 to about 100 microns.

54. The layer of liquid crystalline composition according to claim 53 wherein said layer thickness is from about 4 to about 25 microns.

55. The method according to claim 1 wherein said layer portion in step (b) is in the homogeneous texture of the nematic mesophase.

56. A method of producing a stable spherulitic liquid crystalline texture, comprising:
   a. providing on a substrate a layer of aligned liquid crystalline composition comprising a dielectrically negative nematic liquid crystalline material and from about 0.4 to about 3 percent by weight of an optically active material, said liquid crystalline composition prior to alignment being optically negative and having a light reflection band centered about $\lambda_0 = 2np$ where $n$ = index of refraction and $p$ = helical pitch, the ratio of the helical pitch of the non-aligned liquid crystalline composition to the layer thickness of liquid crystalline composition being from about 1 to about 10;
   b. applying a voltage potential across the layer of liquid crystalline composition; and
   c. removing said voltage potential whereupon spherulitic regions of the liquid crystalline composition are formed within the aligned liquid crystalline composition.

* * * * *

UNITED STATES PATENT AND TRADEMARK OFFICE
CERTIFICATE OF CORRECTION

PATENT NO. : 3,938,880
DATED : February 17, 1976
INVENTOR(S) : Werner E. L. Haas and James E. Adams It is certified that error appears in the above-identified patent and that said Letters Patent are hereby corrected as shown below:

Column 14, line 55: "homoeotropic" should read --homeotropic--.

Column 16, line 34: "homoeotropic" should read --homeotropic--.

Column 16, line 60: "homoeotropic" should read --homeotropic--.

Column 17, line 3: "homoeotropic" should read --homeotropic--.

Signed and Sealed this

Tenth Day of August 1976

[SEAL]

Attest:

RUTH C. MASON
*Attesting Officer*

C. MARSHALL DANN
*Commissioner of Patents and Trademarks*